(12) United States Patent
Yeh

(10) Patent No.: US 7,954,831 B1
(45) Date of Patent: Jun. 7, 2011

(54) SCOOTER HAVING A COLLAPSIBLE STRUCTURE

(76) Inventor: Ching-Ho Yeh, Taichung (TW)

( * ) Notice: Subject to any disclaimer, the term of this patent is extended or adjusted under 35 U.S.C. 154(b) by 0 days.

(21) Appl. No.: 12/715,582

(22) Filed: Mar. 2, 2010

(51) Int. Cl.
*B62M 1/00* (2010.01)

(52) U.S. Cl. ............. 280/87.042; 280/87.01; 280/14.28; 280/655.1; 16/493; 16/900; 403/109.5

(58) Field of Classification Search ............... 280/87.01, 280/87.021, 87.042, 14.21, 14.27, 14.28, 280/655.1; 403/91, 103, 113, 116, 109.5; 16/429, 900
See application file for complete search history.

(56) References Cited

U.S. PATENT DOCUMENTS

| | | | | |
|---|---|---|---|---|
| 1,568,412 A * | 1/1926 | Parkes | ...................... | 280/87.041 |
| 6,318,741 B1 * | 11/2001 | Chen | ......................... | 280/87.041 |
| 6,322,092 B1 * | 11/2001 | Chen | ............................. | 280/279 |
| 6,378,238 B1 * | 4/2002 | Lu | ................................ | 43/18.1 R |
| 6,390,483 B1 * | 5/2002 | Hsu et al. | ................. | 280/87.041 |
| 6,450,517 B1 * | 9/2002 | Lee | ........................... | 280/87.041 |
| 6,481,913 B2 * | 11/2002 | Chen | ................................ | 403/83 |
| 6,485,039 B1 * | 11/2002 | Ming-Fu | ................... | 280/87.041 |
| 6,581,492 B1 * | 6/2003 | Chen | ............................. | 74/551.3 |
| 7,597,333 B2 * | 10/2009 | Stillinger | ................. | 280/87.041 |
| 7,721,391 B2 * | 5/2010 | Bukovitz et al. | ................. | 16/429 |
| 2002/0089138 A1 * | 7/2002 | Reynolds et al. | ......... | 280/87.041 |
| 2002/0089139 A1 * | 7/2002 | Reynolds et al. | ......... | 280/87.041 |
| 2002/0180169 A1 * | 12/2002 | Kwok | ....................... | 280/87.041 |
| 2005/0001399 A1 * | 1/2005 | Yeo et al. | ................... | 280/87.041 |
| 2008/0044269 A1 * | 2/2008 | Pradenas | ....................... | 414/462 |
| 2009/0160150 A1 * | 6/2009 | Johnson | .................... | 280/87.041 |

* cited by examiner

*Primary Examiner* — J. Allen Shriver, II
*Assistant Examiner* — James Triggs
(74) *Attorney, Agent, or Firm* — Alan Kamrath; Kamrath & Associates PA

(57) ABSTRACT

A scooter includes a main frame, a head tube mounted on the main frame, two side plates extending from the head tube and each having a first locking slot and a second locking slot, a handlebar stem mounted on the head tube, a mounting sleeve mounted on the handlebar stem, a locking tube movably mounted on the mounting sleeve and having two locking blocks each locked in the first locking slot or the second locking slot of the respective side plate, and a rotation tube mounted on the mounting sleeve and abutting the locking tube. Thus, the rotation tube can be rotated to move the locking tube relative to the head tube so as to lock or unlock the handlebar stem so that the user only needs to rotate the rotation tube to expand and collapse the handlebar stem easily and quickly.

20 Claims, 7 Drawing Sheets

SCOOTER HAVING A COLLAPSIBLE STRUCTURE

BACKGROUND OF THE INVENTION

1. Field of the Invention

The present invention relates to a vehicle and, more particularly, to a scooter having an exercising effect.

2. Description of the Related Art

A conventional scooter comprises a main frame and a handlebar stem pivotally mounted on the main frame by a quick release. Thus, the handlebar stem is locked on or unlocked from the main frame by operation of the quick release so that the handlebar stem can be expanded or folded. However, the user has to apply a larger force to operate the quick release, thereby wasting the user's energy, and thereby causing inconvenience to the female people or children when operating the quick release to lock or unlock the handlebar stem.

BRIEF SUMMARY OF THE INVENTION

In accordance with the present invention, there is provided a scooter, comprising a main frame, a head tube mounted on the main frame, two opposite side plates extending outwardly from the head tube and each provided with a first locking slot and a second locking slot, a handlebar stem mounted on the head tube and having a lower end inserted into the head tube, a mounting sleeve mounted on the handlebar stem and having a lower end inserted into the head tube, a locking tube movably mounted on the mounting sleeve and having an outer wall provided with two opposite locking blocks each detachably locked in the first locking slot or the second locking slot of a respective one of the two side plates, and a rotation tube rotatably mounted on the mounting sleeve and abutting the locking tube to limit the locking tube on the two side plates.

The mounting sleeve has an outer wall provided with an outer threaded portion, and the rotation tube has an inner wall provided with an inner threaded portion screwed onto the outer threaded portion of the mounting sleeve. The mounting sleeve has a surface provided with two opposite guide rods, and the locking tube has an inner wall provided with two opposite elongate guide grooves slidable on the two guide rods of the mounting sleeve respectively. The locking tube has an upper end provided with an annular retaining groove, and the rotation tube has a lower end mounted on the upper end of the locking tube and provided with an annular retaining flange rotatably mounted in the retaining groove of the locking tube.

The primary objective of the present invention is to provide a scooter having a collapsible structure.

According to the primary objective of the present invention, the rotation tube can be rotated to drive the locking tube to move upward and downward relative to the head tube so as to lock or unlock the handlebar stem so that the user only needs to rotate the rotation tube so as to expand and collapse the handlebar stem easily and quickly, thereby facilitating the user expanding and collapsing the scooter.

According to another objective of the present invention, the locking tube is pushed toward the head tube by rotation of the rotation tube so that each of the two locking blocks of the locking tube is closely locked in the first locking slot or the second locking slot of the respective side plate to lock the locking tube and the mounting sleeve onto the head tube exactly and tightly, thereby preventing the handlebar stem from being loosened easily.

According to a further objective of the present invention, the mounting sleeve is covered by the rotation tube so that the mounting sleeve will not be exposed outwardly to prevent the mounting sleeve from causing danger to the user.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
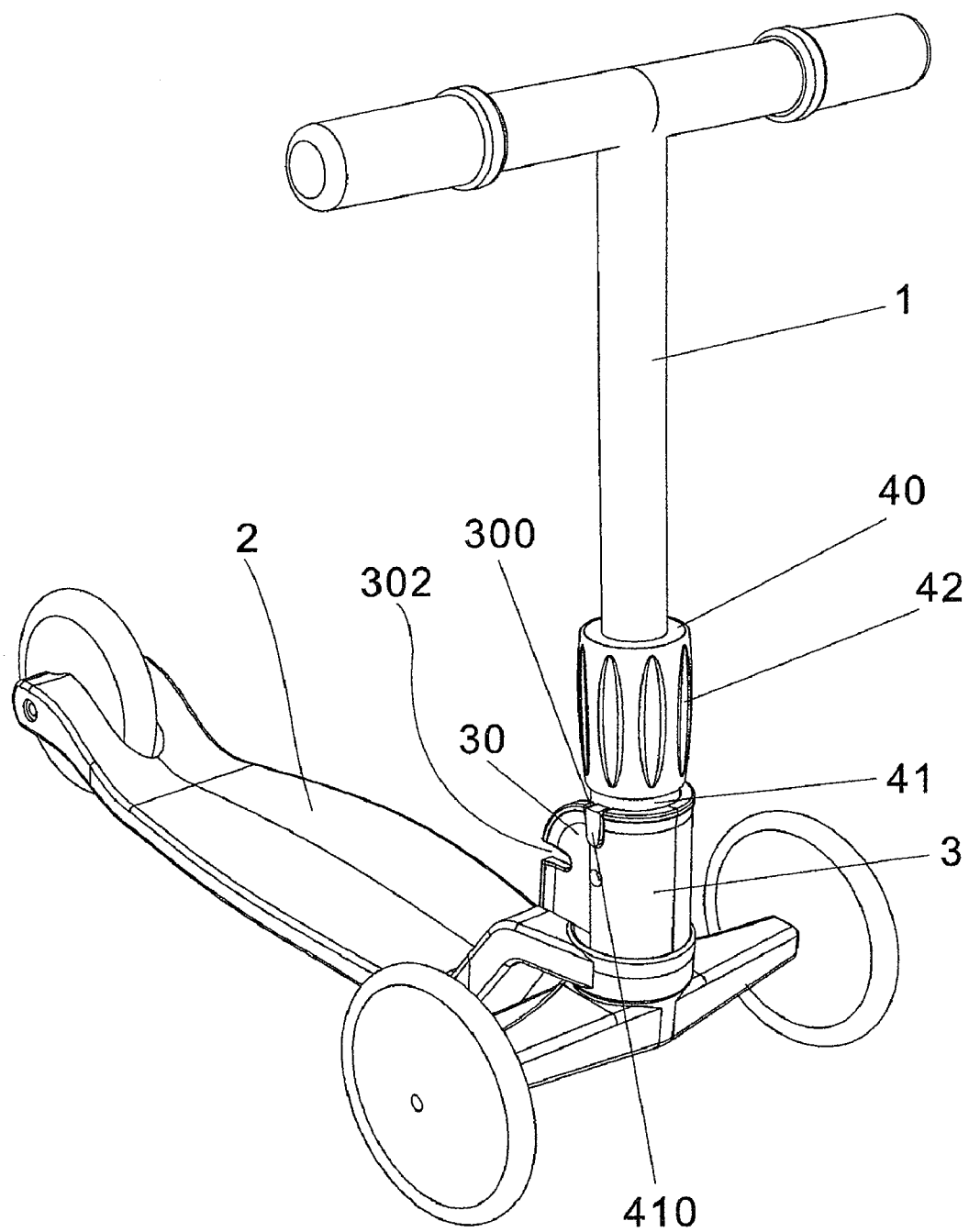
FIG. 1 is a perspective view of a scooter in accordance with the preferred embodiment of the present invention.
Figure 2:
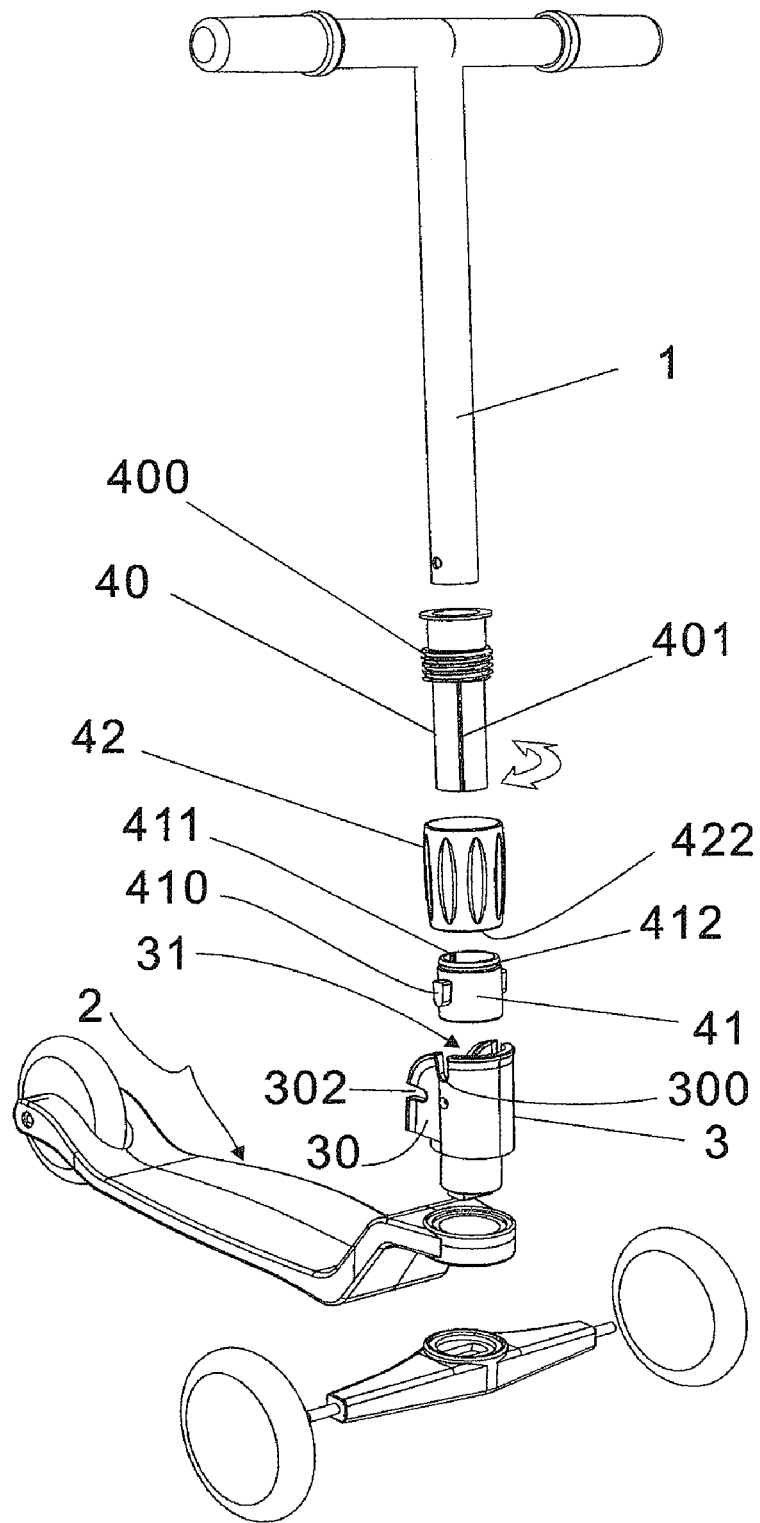
FIG. 2 is an exploded perspective view of the scooter as shown in FIG. 1.
Figure 3:
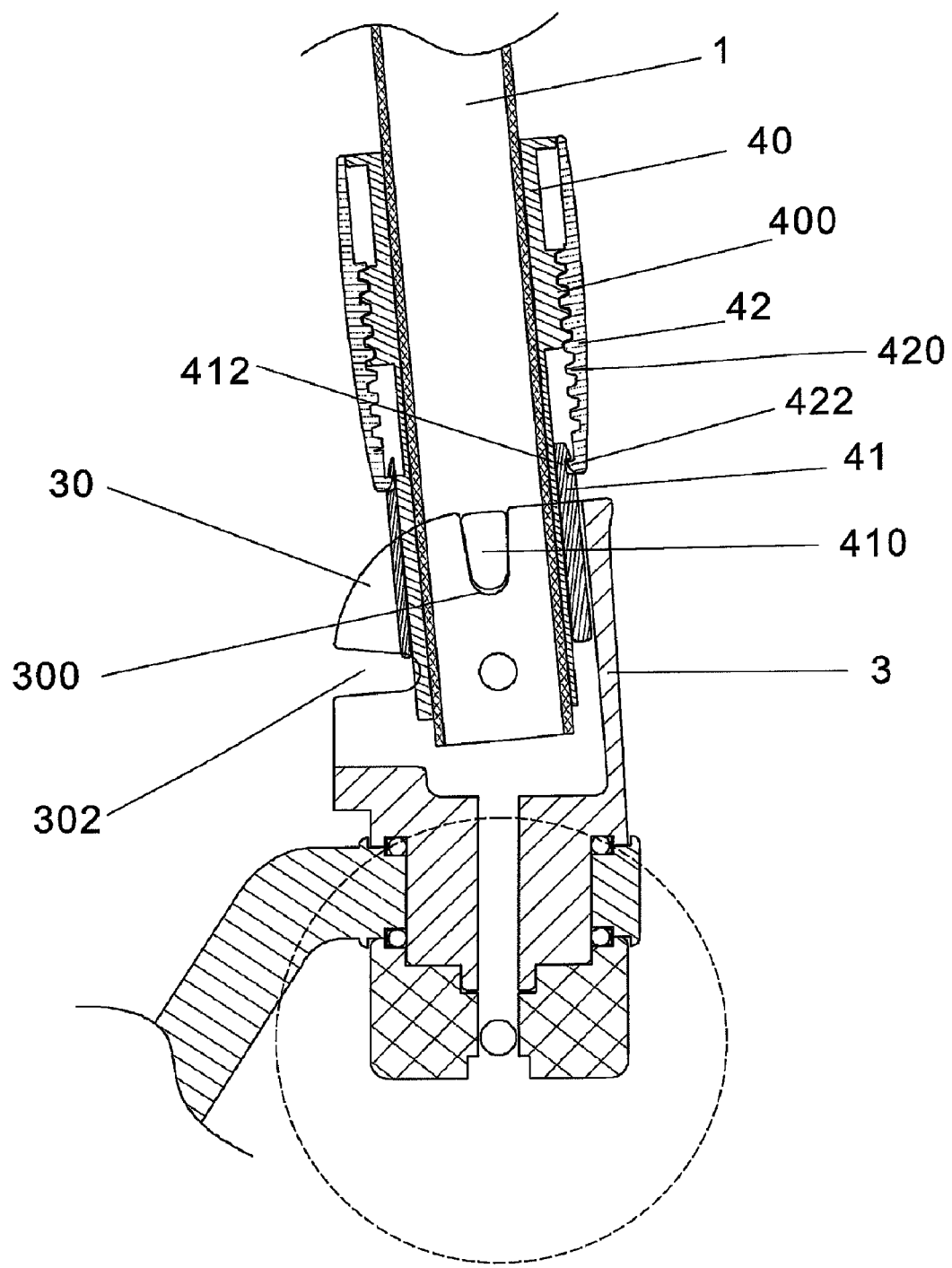
FIG. 3 is a front cross-sectional view of the scooter as shown in FIG. 1.

Referring to the drawings and initially to FIGS. 1-3, a scooter in accordance with the preferred embodiment of the present invention comprises a main frame 2, a head tube 3 mounted on the main frame 2, two opposite side plates 30 extending outwardly from the head tube 3 and each provided with a first locking slot 300 and a second locking slot 302, a handlebar stem 1 mounted on the head tube 3 and having a lower end inserted into the head tube 3, a mounting sleeve 40 mounted on the handlebar stem 1 and having a lower end inserted into the head tube 3, a locking tube 41 movably mounted on the mounting sleeve 40 and having an outer wall provided with two opposite locking blocks 410 each detachably locked in the first locking slot 300 or the second locking slot 302 of a respective one of the two side plates 30, and a rotation tube 42 rotatably mounted on the mounting sleeve 40 and abutting the locking tube 41 to limit the locking tube 41 on the two side plates 30.

The head tube 3 is rotatably mounted on the main frame 2. The head tube 3 has a peripheral wall provided with an opening 31 defined between the two side plates 30.

Each of the two side plates 30 has a sector shape. The first locking slot 300 of each of the two side plates 30 is disposed at a vertical state and extends in an axial direction of the head tube 3. The first locking slot 300 and the second locking slot 302 of each of the two side plates 30 are perpendicular to each other.

The mounting sleeve 40 is sandwiched between the handlebar stem 1 and the head tube 3 and is covered by the rotation tube 42. The mounting sleeve 40 is pivotally mounted on the head tube 3, and the lower end of the mounting sleeve 40 is movable in the opening 31 of the head tube 3 and is movable between the two side plates 30. The mounting sleeve 40 has an outer wall provided with an outer threaded portion 400 and has a surface provided with two opposite guide rods 401.

The locking tube 41 has an inner wall provided with two opposite elongate guide grooves 411 slidable on the two guide rods 401 of the mounting sleeve 40 respectively so that the locking tube 41 is movable axially relative to the mounting sleeve 40 and is non-rotatable relative to the mounting sleeve 40. The locking tube 41 is sandwiched between the mounting sleeve 40 and the head tube 3 and is pivotally mounted on the head tube 3. The locking tube 41 is inserted into the opening 31 of the head tube 3 and is movable axially relative to the head tube 3. The locking tube 41 is movable in the opening 31 of the head tube 3 when each of the two locking blocks 410 of the locking tube 41 is detached from the first locking slot 300 of the respective side plate 30 and is movable between the two side plates 30 when each of the two locking blocks 410 of the locking tube 41 is detached from the second locking slot 302 of the respective side plate 30. The locking tube 41 has an upper end provided with an annular retaining groove 412. The retaining groove 412 of the locking tube 41 is located above the two locking blocks 410.

The rotation tube 42 has an inner wall provided with an inner threaded portion 420 screwed onto the outer threaded portion 400 of the mounting sleeve 40 so that the rotation tube 42 is movable axially on the mounting sleeve 40 when the rotation tube 42 is rotated relative to the mounting sleeve 40. The rotation tube 42 has a lower end mounted on the upper end of the locking tube 41 and provided with an annular retaining flange 422 rotatably mounted in the retaining groove 412 of the locking tube 41 so that the locking tube 41 is movable in concert with the rotation tube 42, and the rotation tube 42 is rotated relative to the locking tube 41. The retaining flange 422 of the rotation tube 42 extends radially and inwardly from the rotation tube 42. The retaining flange 422 of the rotation tube 42 is located under the inner threaded portion 420.

In operation, referring to FIGS. 4-7 with reference to FIGS. 1-3, each of the two locking blocks 410 of the locking tube 41 is locked in the first locking slot 300 of the respective side plate 30 as shown in FIG. 1, so that the mounting sleeve 40 is locked onto the head tube 3, and the handlebar stem 1 is disposed at a vertical state for use with a user.

Figure 4:
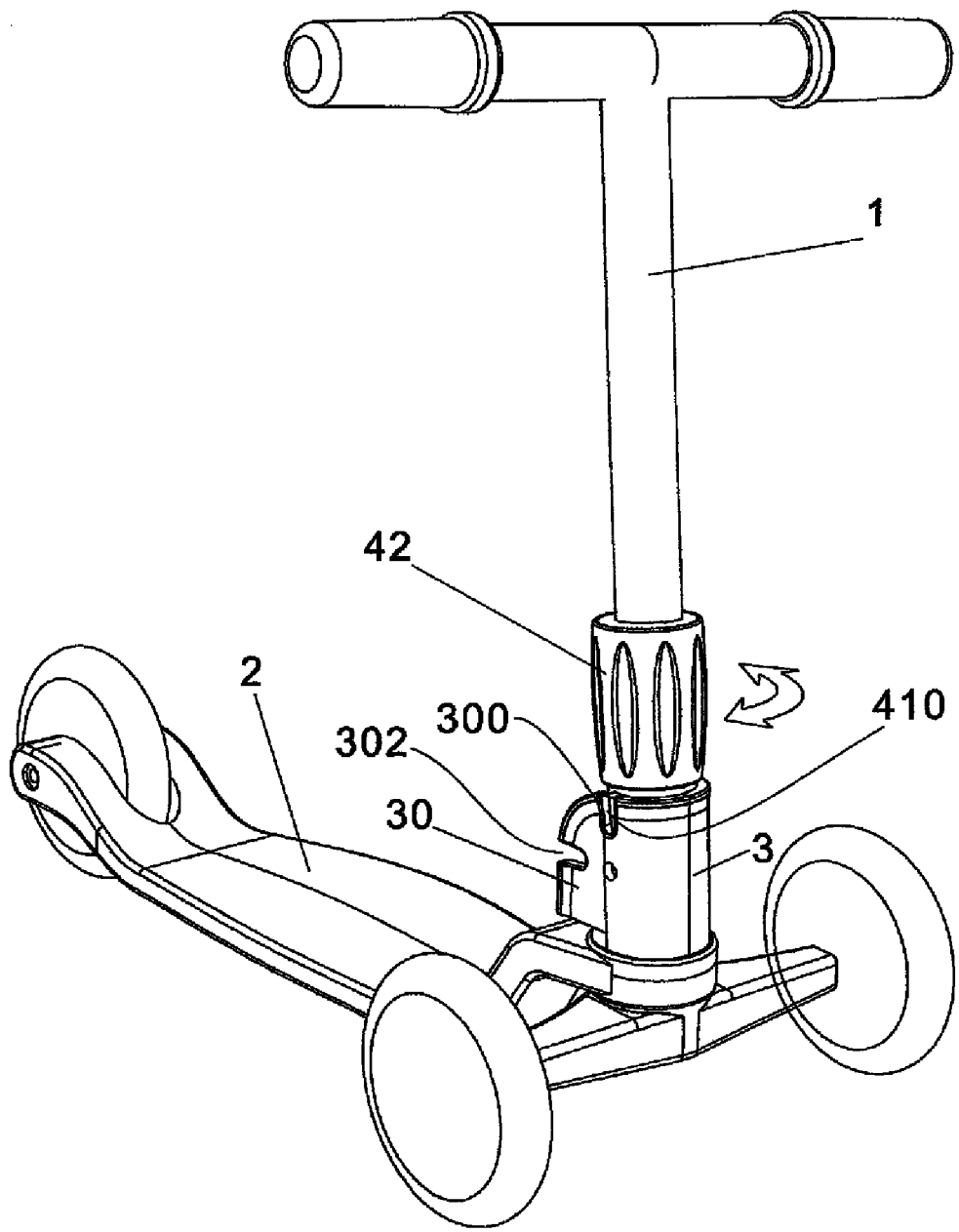
FIG. 4 is a schematic operational view of the scooter as shown in FIG. 1.
Figure 5:
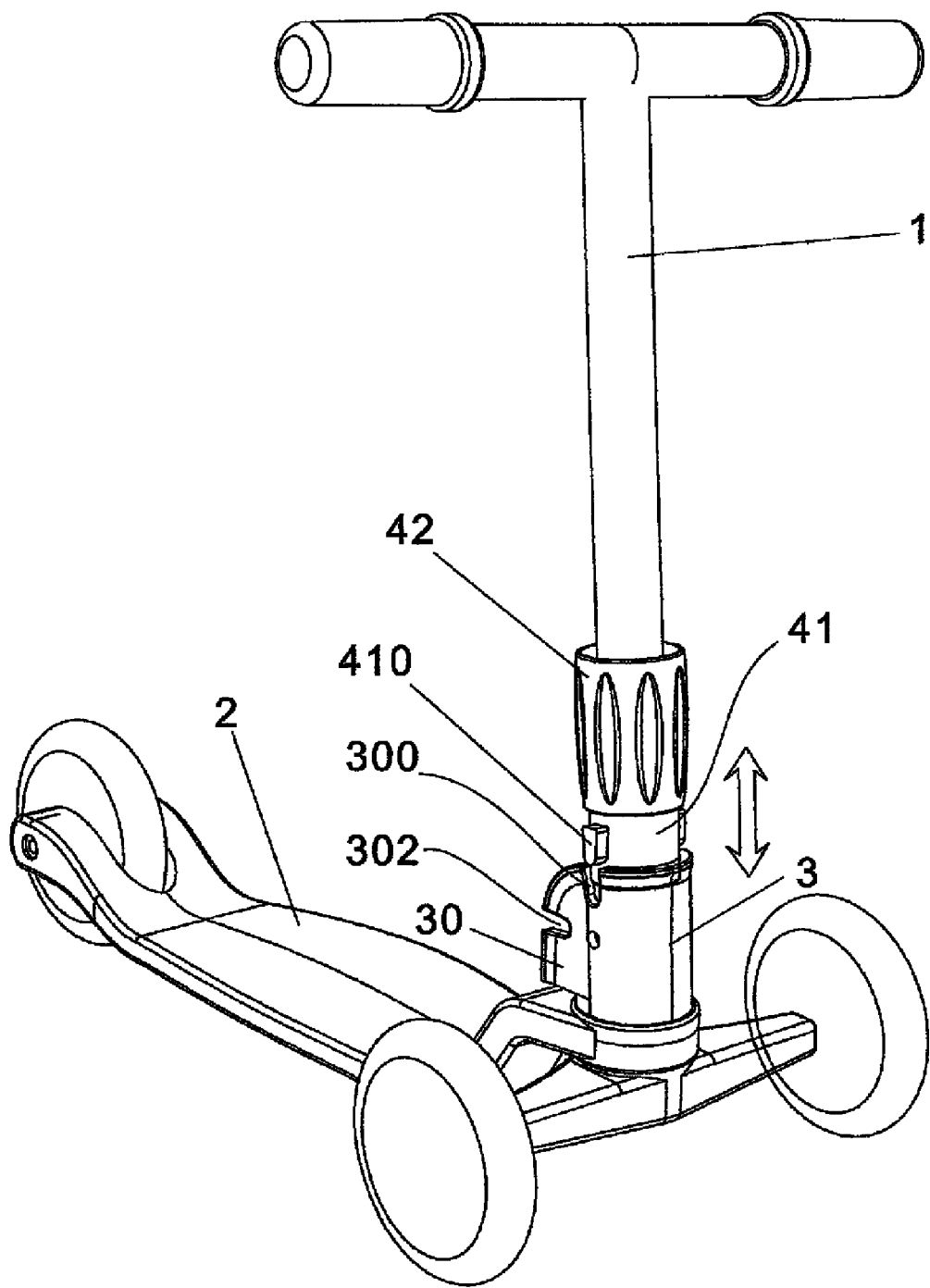
FIG. 5 is a schematic operational view of the scooter as shown in FIG. 4.
Figure 6:
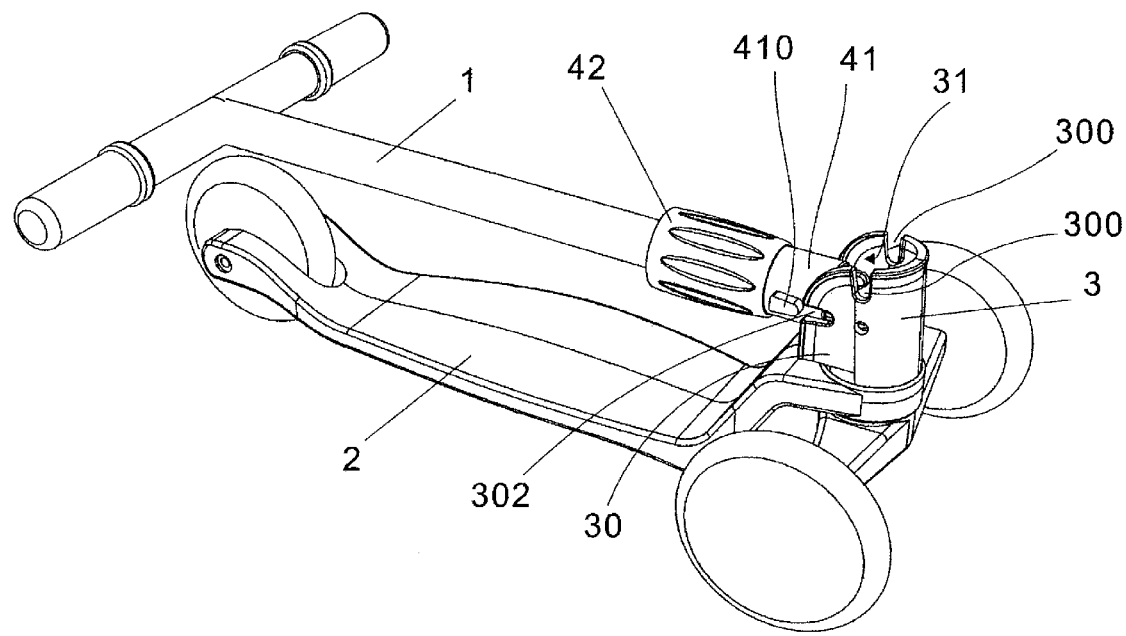
FIG. 6 is a schematic operational view of the scooter as shown in FIG. 5.

When the rotation tube 42 is rotated relative to the mounting sleeve 40 as shown in FIG. 4, the rotation tube 42 is movable axially on the mounting sleeve 40 to drive the locking tube 41 to move and rotate relative to the mounting sleeve 40. At this time, the guide grooves 411 of the locking tube 41 are limited by the two guide rods 401 of the mounting sleeve 40 so that the locking tube 41 is movable axially relative to the mounting sleeve 40 and is non-rotatable relative to the mounting sleeve 40. Thus, the locking tube 41 is moved axially relative to the head tube 3, and each of the two locking blocks 410 of the locking tube 41 is moved upward to detach from the first locking slot 300 of the respective side plate 30 as shown in FIG. 5, so that the mounting sleeve 40 is unlocked from the head tube 3. In such a manner, the mounting sleeve 40 is pivoted relative to the head tube 3 so that the handlebar stem 1 is pivoted relative to the head tube 3 and is moved to abut the main frame 2 as shown in FIG. 6.

Figure 7:
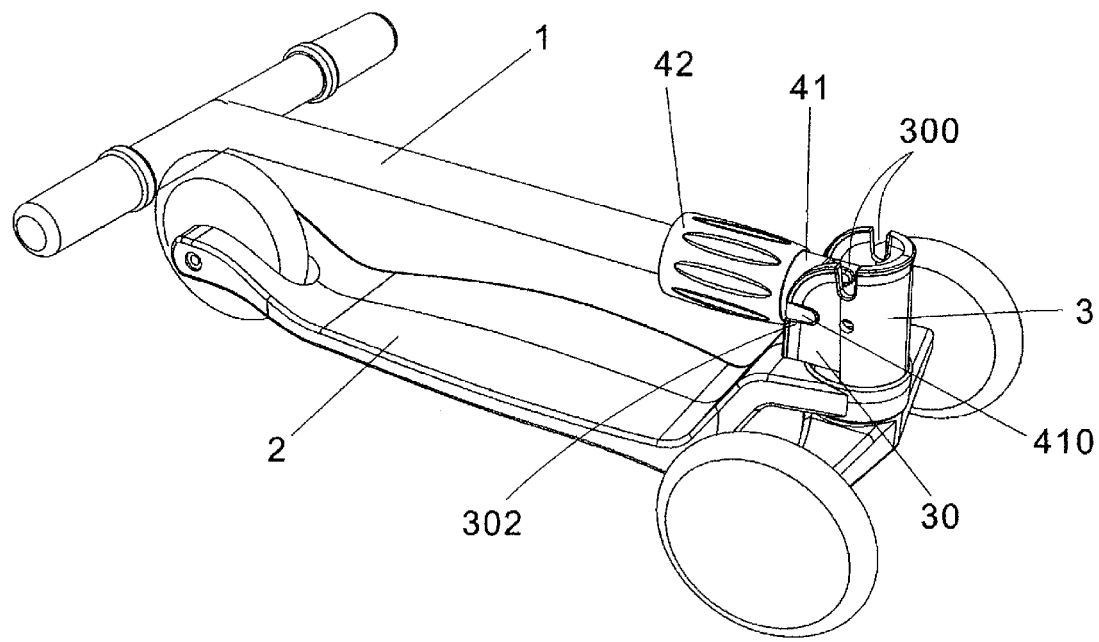
FIG. 7 is a schematic operational view of the scooter as shown in FIG. 6.

When the rotation tube 42 is rotated relative to the mounting sleeve 40 in the reverse direction, the rotation tube 42 is movable axially on the mounting sleeve 40 to drive the locking tube 41 to move relative to the mounting sleeve 40. Thus, the locking tube 41 is moved axially relative to the head tube 3, and each of the two locking blocks 410 of the locking tube 41 is inserted into and locked in the second locking slot 302 of the respective side plate 30 as shown in FIG. 7, so that the mounting sleeve 40 is locked on the head tube 3 again. In such a manner, the handlebar stem 1 abuts the main frame 2 so that the scooter is folded.

Accordingly, the rotation tube 42 can be rotated to drive the locking tube 41 to move upward and downward relative to the head tube 3 so as to lock or unlock the handlebar stem 1 so that the user only needs to rotate the rotation tube 42 so as to expand and collapse the handlebar stem 1 easily and quickly, thereby facilitating the user expanding and collapsing the scooter. In addition, the locking tube 41 is pushed toward the head tube 3 by rotation of the rotation tube 42 so that each of the two locking blocks 410 of the locking tube 41 is closely locked in the first locking slot 300 or the second locking slot 302 of the respective side plate 30 to lock the locking tube 41 and the mounting sleeve 40 onto the head tube 3 exactly and tightly, thereby preventing the handlebar stem 1 from being loosened easily. Further, the mounting sleeve 40 is covered by the rotation tube 42 so that the mounting sleeve 40 will not be exposed outwardly to prevent the mounting sleeve 40 from causing danger to the user.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A scooter, comprising:
a main frame;
a head tube mounted on the main frame;
two opposite side plates extending outwardly from the head tube and each provided with a first locking slot and a second locking slot;
a handlebar stem mounted on the head tube and having a lower end inserted into the head tube;
a mounting sleeve mounted on the handlebar stem and having a lower end inserted into the head tube;
a locking tube movably mounted on the mounting sleeve and having an outer wall provided with two opposite locking blocks each detachably locked in the first locking slot or the second locking slot of a respective one of the two side plates; and
a rotation tube rotatably mounted on the mounting sleeve and abutting the locking tube to limit the locking tube on the two side plates.

2. The scooter of claim 1, wherein
the mounting sleeve has an outer wall provided with an outer threaded portion;
the rotation tube has an inner wall provided with an inner threaded portion screwed onto the outer threaded portion of the mounting sleeve.

3. The scooter of claim 1, wherein
the mounting sleeve has a surface provided with two opposite guide rods;
the locking tube has an inner wall provided with two opposite elongate guide grooves slidable on the two guide rods of the mounting sleeve respectively.

4. The scooter of claim 2, wherein
the locking tube has an upper end provided with an annular retaining groove;
the rotation tube has a lower end mounted on the upper end of the locking tube and provided with an annular retaining flange rotatably mounted in the retaining groove of the locking tube.

5. The scooter of claim 1, wherein each of the two side plates has a sector shape.

6. The scooter of claim 1, wherein the first locking slot and the second locking slot of each of the two side plates are perpendicular to each other.

7. The scooter of claim 3, wherein the locking tube is movable axially relative to the mounting sleeve and is non-rotatable relative to the mounting sleeve.

8. The scooter of claim 1, wherein the locking tube is sandwiched between the mounting sleeve and the head tube.

9. The scooter of claim 1, wherein the locking tube is pivotally mounted on the head tube.

10. The scooter of claim 7, wherein the locking tube is movable axially relative to the head tube.

11. The scooter of claim 4, wherein the retaining groove of the locking tube is located above the two locking blocks.

12. The scooter of claim 2, wherein the rotation tube is movable axially on the mounting sleeve when the rotation tube is rotated relative to the mounting sleeve.

13. The scooter of claim 4, wherein
 the locking tube is movable in concert with the rotation tube;
 the rotation tube is rotated relative to the locking tube.

14. The scooter of claim 4, wherein the retaining flange of the rotation tube extends radially and inwardly from the rotation tube.

15. The scooter of claim 4, wherein the retaining flange of the rotation tube is located under the inner threaded portion.

16. The scooter of claim 1, wherein
 the mounting sleeve is sandwiched between the handlebar stem and the head tube;
 the mounting sleeve is covered by the rotation tube.

17. The scooter of claim 1, wherein the head tube has a peripheral wall provided with an opening defined between the two side plates.

18. The scooter of claim 17, wherein
 the locking tube is inserted into the opening of the head tube;
 the locking tube is movable in the opening of the head tube when each of the two locking blocks of the locking tube is detached from the first locking slot of the respective side plate and is movable between the two side plates when each of the two locking blocks of the locking tube is detached from the second locking slot of the respective side plate;
 the mounting sleeve is pivotally mounted on the head tube;
 the lower end of the mounting sleeve is movable in the opening of the head tube and is movable between the two side plates.

19. The scooter of claim 1, wherein
 the first locking slot of each of the two side plates is disposed at a vertical state;
 the first locking slot of each of the two side plates extends in an axial direction of the head tube.

20. The scooter of claim 17, wherein the head tube is rotatably mounted on the main frame.

* * * * *